Figure 1:
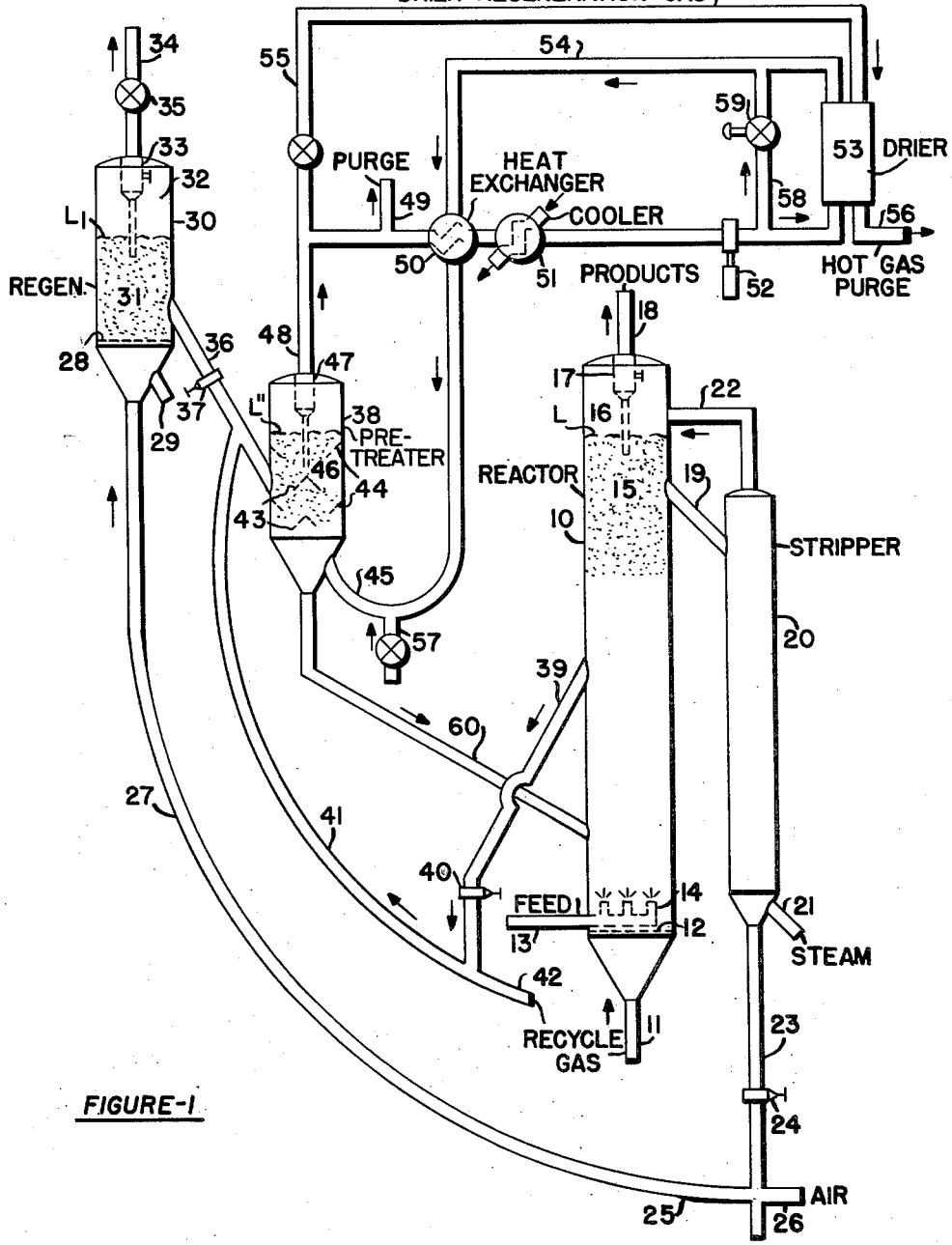

United States Patent Office 2,772,217
Patented Nov. 27, 1956

2,772,217

HYDROFORMING PROCESS

Edward W. S. Nicholson, Baton Rouge, La., assignor to Esso Research and Engineering Company, a corporation of Delaware Application April 8, 1953, Serial No. 347,523

15 Claims. (Cl. 196—50)

This invention relates to the catalytic conversion of hydrocarbon fractions boiling within the motor fuel range of low knock rating into high octane number motor fuels rich in aromatics and particularly to a process whereby such conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750–1150° F. in the pressure range of about 50–1000 lbs. per sq. inch and in contact with such catalysts as molybdenum oxide, chromium oxide or, in general, oxides or sulfides of metals of groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum oxide to convert it to activated alumina or upon a zinc aluminate spinel.

It has been proposed in application Serial No. 188,236, filed October 3, 1950, now Patent No. 2,689,823, to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed-bed hydroforming such as (1) the operations are continuous, (2) the vessels and other equipment can be designed for single rather than dual functions, (3) the reactor temperature is substantially constant throughout the dense bed, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles into a stream of hot hydrogen-rich recycle gas in a transfer line, whereby the catalyst particles are subjected to a reconditioning treatment during their passage through the transfer line into the reactor. This reconditioning or pretreatment of the regenerated catalyst involves at least a partial reduction of higher catalytic metal oxides formed during regeneration to a lower or more catalytically active form of catalytic metal oxide. In view of the high temperature of the regenerated catalyst (1050–1200° F.), the exothermic character of the reaction between the hot, freshly regenerated catalyst and the hydrogen and the heat of adsorption of the water formed by this reaction, it is necessary to make the transfer line very short and of relatively small diameter in order to keep the time of contact of the freshly regenerated catalyst and the hydrogen-containing gas sufficiently short to avoid overtreatment and/or thermal degradation of the catalyst. It has been proposed to alleviate this problem by mixing recycle reactor catalyst with the freshly regenerated catalyst to lower and control the temperature of pretreatment while simultaneously recovering the sensible heat of the regenerated catalyst as well as the heat released in the partial reduction of the catalytic metal oxides as well as in the adsorption of the water formed for use in the main reaction or hydroforming zone.

While these expedients have been very helpful in meeting and overcoming some of the problems encountered in fluid hydroforming, the field of pretreatment continues to offer opportunities for further improvement in this process. It is noted in this connection that the group VI metals not only form a number of different oxides of varying catalytic activity but the several oxides can exist in amorphous and also in crystalline form and the catalytic activity will depend to a great extent upon the particular form of the oxide. In general, the crystalline oxides are less active than the amorphous oxides.

Water has a pronounced effect upon the physical characteristics of the catalytic metal oxide and upon many of the catalyst supports or spacing agents, and water or water vapor comes into contact with the catalyst in different ways and in varying amounts in hydroforming processes. For example, steam is frequently used to strip hydrogen or hydrocarbon materials from spent catalyst before subjecting the catalyst to regeneration. During regeneration, water is formed by combustion of residual hydrogen and also hydrocarbon materials associated with the spent catalyst, the amount of water formed varying with the amount of hydrogen or hydrocarbons associated with the spent catalyst. Moreover, the pretreatment or partial reduction of the regenerated catalyst with hydrogen forms further amounts of water and the hydrogen-rich recycle gas ordinarily used for pretreatment generally has a small water content which will also affect the hydroforming catalyst.

It is the object of this invention to provide the art with an improved method of catalytically reforming hydrocarbon fractions.

It is also the object of this invention to provide the art with a method whereby the catalyst activity and selectivity in a catalytic reforming process may be substantially improved.

It is a further object of this invention to provide the art with an improved method of catalytically reforming hydroforming fractions in accordance with the fluidized solids technique in which pretreatment of the regenerated catalyst is controlled to maintain catalyst activity and selectivity.

It is a further object of this invention to control or minimize the deleterious effect of water upon reforming catalysts used in a fluid hydroforming system.

These and other objects of this invention will appear more clearly from the detailed specification and claims which follow.

It has been found that catalyst activity and selectivity in a fluid hydroforming system can be maintained in a highly effective manner if freshly regenerated catalyst particles are subjected to pretreatment with hydrogen-rich or recycle gas that is circulated through a drier to lower or control water concentration before introduction thereof into the bottom of the pretreater. The catalyst holding time and the pretreating gas throughput are so correlated that water released during pretreatment is effectively desorbed and stripped off during pretreating and before the catalyst enters the reactor. This pretreatment with dry or low water content hydrogen-containing gas is particularly effective if it is carried out at temperatures below about 1050° F., preferably at or below about 1000° F.

Figure 2:
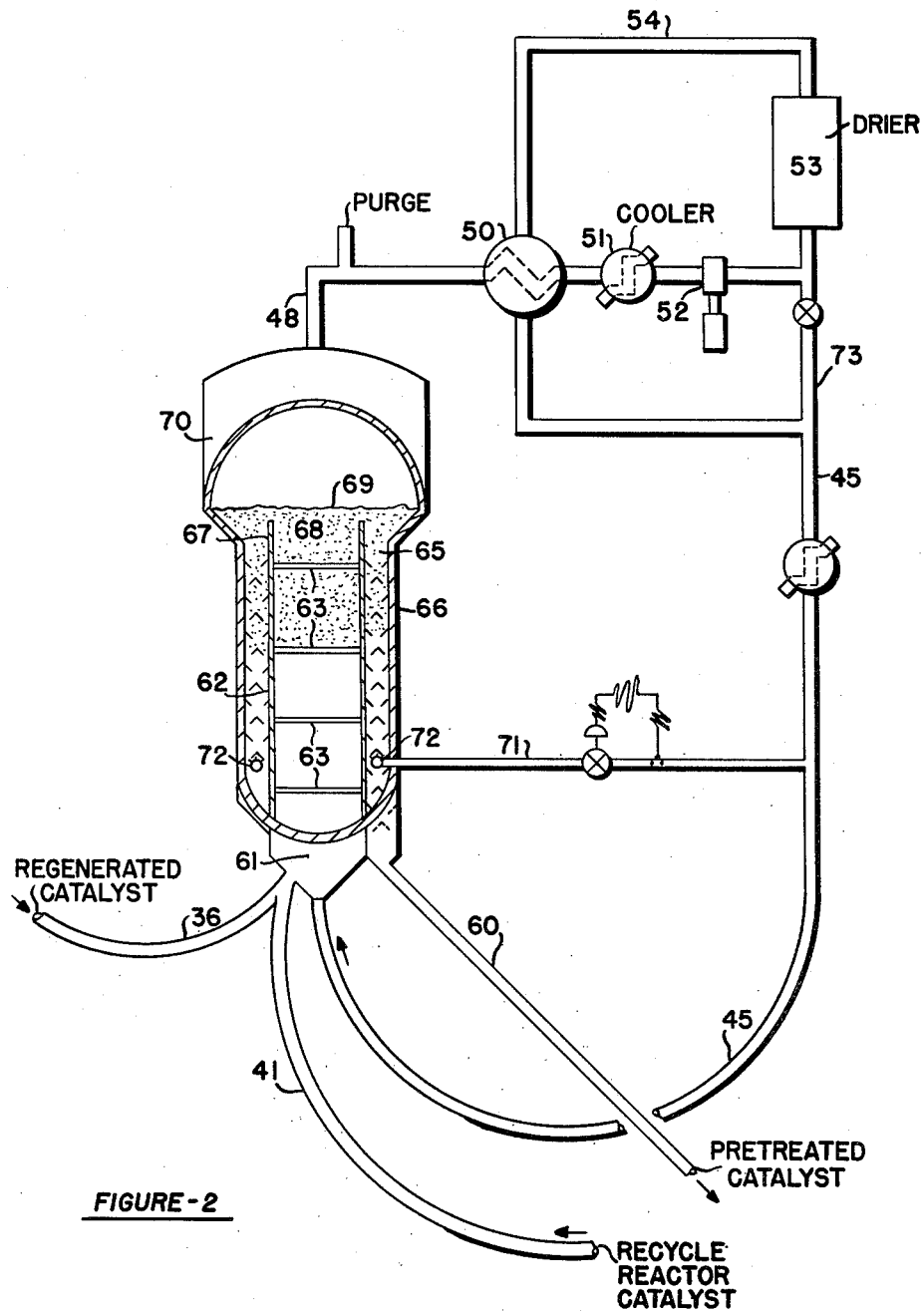

Reference is made to the accompanying drawing which illustrates in Fig. 1 a schematic flow plan of one embodiment of the present invention, and in Fig. 2 a preferred form of pretreater and gas circulating system.

In Fig. 1 of the drawing, 10 is the reactor vessel which is provided at the bottom with an inlet line 11 for the introduction of hot, hydrogen-rich or recycle process gas which supplies a substantial part of the endothermic heat of reaction and minimizes the formation of carbonaceous deposits upon the catalyst. A perforated plate or grid 12 is preferably arranged horizontally within the vessel 10 for insuring uniform distribution of the incoming recycle gas over the entire cross-section of the reactor vessel. A separate inlet line 13 connected to a distributor ring 14 or the like is shown for the introduction of naphtha or hydrocarbon feed stock above the grid member 12. While the feed stock may be introduced below the grid, alone or in admixture with recycle gas, it is ordinarily preferred to introduce it above the grid member and desirably at such a distance above the grid as to avoid any danger of excessive temperature such as may occur in the region where the hot recycle gas enters the reactor dense bed.

The reactor vessel 10 is charged with finely divided hydroforming catalyst particles and the superficial velocity of the vapors and gases passing upwardly through the vessel 10 is so controlled as to form a dense, fluidized turbulent bed of catalyst 15 having a definite level L or boundary separating the lower dense phase 15 from a dilute or disperse phase 16 in the upper part of the reactor vessel formed by the entrainment of small amounts of catalyst in the gaseous or vaporous reaction products. The reaction products are taken overhead from the reactor, preferably through a cyclone separator 17, or the like, for separating entrained catalyst particles which are returned to the reactor dense bed 15 through the dip pipe attached to the bottom of the separator. Reaction products are conducted via line 18 to suitable fractionating, stabilizing and/or storage equipment.

Catalyst particles are continuously withdrawn directly from the dense bed 15 through a withdrawal conduit 19 and discharged into an external stripping cell or vessel 20. The stripper cell could also be arranged within the reactor vessel as by providing a vertical conduit or cell, preferably extending above the dense bed level L and provided with a restriction orifice or port for controlling the discharge of catalyst into the stripper cell. A tap 21 is arranged in the lower portion of the stripper for introducing a suitable stripping gas such as steam, nitrogen, scrubbed flue gas or the like which will serve to remove entrained or adsorbed hydrogen or hydrocarbon materials that would otherwise be carried to the regeneration zone and burned therein. The stripping gas and stripped gases are withdrawn overhead from the stripper 20 and passed through line 22 into the upper part of the reactor 10 in the event that substantial amounts of catalyst are entrained therein and recovery of which entrained catalyst in the reactor cyclone separator 17 is desired. A connection between line 22 and product outlet line 18 may be provided if it is desired to have the stripping gas by-pass the reactor. Moreover, if nitrogen or scrubbed flue gas is used for stripping, it would be preferable to provide separate recovery means for handling the off-gas from the stripper in order to avoid the accumulation of these inert gases in the recycle gas. The lower end of the stripping cell 20 is connected to conduit 23 and forms therewith a standpipe for developing fluistatic pressure in the stripped spent catalyst stream sufficient to facilitate its transfer to the regenerator side. A slide valve 24 or the like is provided near the base of conduit 23 to control the withdrawal of spent catalyst from the reactor. If desired or necessary to maintain the catalyst in a fluidized state, one or more gas taps can be provided along conduit 23 for the introduction of aeration or fluidizing gas.

The stripped spent catalyst is discharged from the base of standpipe or conduit 23 into transfer line 25 where it is picked up by a stream of regeneration gas or air supplied through line 26 and conveyed through the spent catalyst riser 27 and through a perforated plate or grid 28 into regenerator 30. In order to prevent overtreatment of the spent catalyst in transfer line 25 and riser 27, it is preferable to use only a minor part of the air necessary for regeneration as carrier gas for conveying the spent catalyst to the regenerator and to add the remainder or major part of the air necessary for regeneration through a separate inlet line 29 or additional lines discharging directly into the regenerator vessel.

The superficial velocity of the regeneration gases through the vessel 30 is so controlled as to form a dense, fluidized turbulent bed 31 of catalyst particles and gas having a definite level L' superposed by a dilute or disperse phase 32 in the upper part of the regenerator comprising small amounts of catalyst entrained in the regeneration gases. The regeneration gases are taken overhead from the regenerator 30, preferably through a cyclone separator 33 or the like which serves to remove most of the catalyst particles from the gas for return to the dense bed 31 through the dip pipe attached to the bottom of the cyclone separator. The regeneration gases, essentially free from catalyst particles, pass through outlet line 34 and pressure control valve 35 to a waste gas stack or to suitable scrubbing and storage facilities in the event that it is desired to use the gas for stripping.

Regenerated catalyst is withdrawn from the dense bed 31 through withdrawal conduit 36 and is discharged through slide valve 37 or suitable flow control means into pretreater vessel 38. If desired, the regenerated catalyst may be given a stripping treatment either in an internal or external stripping cell or in the transfer line 36.

In order to control the pretreatment reaction that is carried out in vessel 38, it is necessary or desirable to cool the regenerated catalyst from average regenerator temperatures of about 1200° F. to approximately 1050° F. or below. This cooling should be effected in such manner that the sensible heat of the regenerated catalyst as well as the heat of reduction and adsorption is transferred or transferrable to the reaction or reforming zone. This may be done by bringing a stream of reactor catalyst into indirect heat exchange relation to the regenerated catalyst before or during pretreatment, or it may be done by direct addition of reactor catalyst as shown in the drawing and as will now be described. Reactor catalyst is withdrawn from the reactor dense bed 15 through conduit 39 at a rate controlled by slide valve 40 or other suitable flow control means. The stream of recycle reactor catalyst is discharged into transfer line 41 where the catalyst particles are picked up by a stream of carrier gas such as recycle gas or hydrogen supplied through inlet line 42. The mixture of reactor catalyst and carrier gas is discharged into the regenerated catalyst transfer line 36 or directly into the pretreating vessel 38 along with the regenerated catalyst so that the relatively cool reactor catalyst is thoroughly mixed with the hot regenerated catalyst to cool the latter quickly to the desired temperature before it has appreciable time of contact with the pretreating gas.

The pretreater vessel 38 may be a simple vertical elongated vessel of sufficient size to provide adequate catalyst holding time to effect the pretreatment, but improved results can be obtained through use of some form of vessel that will permit countercurrent contact of catalyst and pretreating gas. According to this modification, the vessel 38 is provided either with horizontal perforated plates and downcomers or with suitable baffles such as side to side baffles or disc and donut baffles, as shown. In this embodiment, the catalyst is discharged into the pretreater stripper vessel at or above the mid point of the vessel. A plurality of discs 43 and donut baffles 44 are arranged in vertically spaced relation to cause the catalyst to alternately converge and diverge, thereby improving contact of the catalyst particles and pretreating gas and reducing the degree of top-to-bottom mixing of the catalyst to insure that no catalyst can leave the bottom of the pretreater vessel without having undergone adequate reduction and subsequent stripping for removal of water. The pretreating gas is introduced via line 45 into the lower part of the pretreating vessel. A distributor ring or other suitable means may be provided to improve the distribution of the incoming pretreating gas.

The superficial velocity of the pretreating gas is so controlled as to form a dense, fluidized bed 46 of catalyst particles having a definite level L″. The pretreating gases containing water formed in the pretreatment and/or in the regeneration and stripped from the catalyst in the vessel 38 are taken overhead through cyclone separator 47 which serves to separate the bulk of the catalyst particles entrained in the outgoing gases. The gases are withdrawn from the pretreater cyclone 47 through line 48, excess amounts of gas are discharged from the system through purge line 49 while the remainder is passed through drier 53 for recycling in the process as described below.

The pretreater overhead gas passing through line 48 is cooled by passing through heat exchanger 50 and cooler 51, is compressed in booster 52 to a sufficient pressure to recycle it through the system, and is sent through drier 53. This drier may contain pellets or granules of activated alumina, activated silica, or other suitable drying agent. The dried gas is taken through line 54, heat exchanger 50 where it recovers the major part of the heat removed from the gas stream in cooling it prior to drying, and through line 45 back to the pretreater-stripper. The temperature of the gas leaving the heat exchanger 50 through line 45 is about 900–1000° F. The temperature of the gas entering the drier is maintained in the range of 100–500° F.

The drier must be regenerated from time to time. This may be accomplished in the conventional manner by employing two driers, one of which is in drying service while the other is being regenerated by passing hot gas through it at temperatures of 600–1100° F. A preferred alternative to this, shown in the drawing, involves providing a hot gas bypass line 55 which permits passing hot recycle gas at about 950–1050° F. through the drier in the opposite direction to that normally used in drying the gas. This regeneration gas is purged through line 56. During this short drier regeneration period, extra recycle gas from the reactor recycle gas compressors is provided through line 57.

The water content of the dried pretreating gas is controlled throughout the period of operation of the drier on stream by by-passing a controlled amount of gas around the drier 53 through line 58 controlled by valve 59. In this way, the water content of the gas entering the pretreater through line 45 is controlled in the range of 0.1 to 1 mole percent. The water concentration of the gas leaving the vessel 38 and entering drier 53 is in the range of 2 to 10 mole percent or more depending on the ratio of recycle pretreating gas to catalyst used, but it is preferred to maintain the maximum water concentration leaving the pretreater below 5% and preferably at about 2–3 mole percent.

In operation of the pretreater, the regenerated catalyst entering through line 36 normally contains about 0.2 to 1 wt. percent water. It is preferred to reduce the catalyst to its optimum valence state in the pretreater, to remove the water thus formed, and to reduce the final water content of the catalyst leaving the stripper to about 0.1 to 0.8 wt. percent. Moreover, it is preferred to maintain the water content of the gas in the pretreating zone above about 0.5 mole percent and below about 5 mole percent, preferably about 2–3 mole percent. The hydrogen-rich pretreating and/or stripping gas entering the pretreating zone 38 contains about 0.1 to 1 preferably about 0.3 to 1.0 mole percent water. For a catalyst consisting of 10 wt. percent $MoO_3$ on activated alumina introduced into the pretreater at a valence state of 6 and reduced in the pretreater to a valence state of about 4, about 6 to 40 standard cubic feet of recycle gas are passed through the pretreater for each pound of catalyst introduced into the pretreater. The holding time of the catalyst in the pretreating section is 2 to 60 minutes, and in the stripping section the holding time is 15 to 60 minutes to allow adequate time for desorption of water from the catalyst. Five to six or more stages are provided in both the pretreating and stripping sections. These stages provide for better contacting of the gas streams with the catalyst and minimize top-to-bottom mixing of the catalyst so that no catalyst can leave the vessel without being adequately pretreated and stripped. Pretreating temperature is held at 950–1050° F.

The hydrogen concentration of the recycled gas used for pretreating and stripping is maintained in the range of 40–80 mole percent through the introduction of fresh recycle gas from the reactor along with the recycled reactor catalyst in line 41, and purging of low hydrogen content gas through line 49.

The water concentration on the catalyst leaving the pretreater-stripper is preferably maintained at such a value that it supplies the desired quantity of water to the reactor without the necessity for adding extraneous water to the reactor. For example, at 1.0 catalyst to oil ratio and using a 4000 cubic feet per barrel recycle gas rate in the reactor, 0.5 wt. percent water removed from the catalyst in the reactor will add about 0.6 mole percent water to the gaseous materials in the reactor, assuming no further valence change of the catalyst in the reactor. Inasmuch as the catalyst leaving the reactor generally contains a minimum of 0.1 to 0.3 wt. percent water, the stripping operation in the pretreater system may be controlled so that the catalyst entering the reactor contains about 0.6 to 0.8 wt. percent water. If additional water is released in the reactor as a result of a further valence change of the catalyst, this adsorbed water content must be accordingly reduced. Alternatively, the catalyst may be more completely dried in the stripper and the concentration of water in the reactor controlled by the addition of extraneous water to the reactor. The pretreated and stripped catalyst is withdrawn from the bottom of pretreater vessel 38 through line 60 and is transferred therethrough into the reactor vessel 10.

A preferred form of pretreater or pretreater-stripper is shown in Fig. 2. In Fig. 2, the same reference numeral is used as on the corresponding part in Fig. 1 but the reactor and the regenerator have been omitted in order to simplify the drawing. In Fig. 2, freshly regenerated catalyst is supplied through line 36 and recycle reactor catalyst is preferably supplied through line 41 in sufficient amount to regulate or control the temperature of the regenerated catalyst during pretreatment. The catalyst particles are discharged into inlet chamber 61 in the pretreater. Dried recycle gas or recycle gas of controlled water content is supplied to the inlet chamber 61 through inlet line 45. The pretreat vessel comprises an inner section 61 defined by draft tube 62 provided with spaced baffle or perforated grid members 63 and an outer, stripping section 65 formed by cylindrical wall member 66 surrounding the draft tube 62. The catalyst particles suspended in recycle gas pass upwardly through several spaced, perforated grids 63 which serve to prevent backmixing of the catalyst and premature discharge of regenerated catalyst from the pretreater. The pretreated catalyst mixture forms a dense, fluidized bed 68 above the uppermost grid 63. The outer wall member 66 is flared outwardly adjacent the top 67 of the draft tube 62 in order that the catalyst will separate from the gas stream above the uppermost grid 64 to form a dense bed 68 having a definite level 69. The pretreat gases pass overhead from dense bed 68 into the dome-shaped upper section 70 of the vessel.

The pretreated catalyst mixture overflows the upper end 67 of draft tube 62 into the stripping section 65 between the draft tube 62 and the wall 66. Baffle members such as disc and donut or side to side baffles are arranged in the stripping section to improve contact of the stripping gas with the catalyst particles. Stripping gas such as dried recycle gas is supplied to the lower part of the stripping section through line 71 and distributor ring 72 or the like. The stripping gas is desirably the same gas used for pretreating, suitable flow control means being provided to supply about 20 to 35% of the total gas to the pretreater to the stripping section and the remainder of the gas through line 45 to the bottom of the pretreating section. In this way adequate gas is supplied for effecting the desired reduction of the regenerated catalyst and sufficient gas of low water content is supplied in the proper location to strip off water formed in or on the regenerated catalyst by the reduction. The stripped catalyst is discharged from the bottom of the stripper section into transfer line 60 through which it is passed into the reactor vessel.

The stripping gas passes overhead from the stripping section into the enlarged or dome-shaped upper part of the vessel where it is mixed with the pretreating gas. The gas mixture of high water content is withdrawn through line 48, passed through heat exchanger 50 where it is brought into indirect heat exchange relation to the dried recycle gas. The cooled, wet, recycle gas is compressed in compressor 52 and circulated through drier 53 and thence via line 54 through heat exchanger 50 and thence to line 45 for recycling to the pretreater. A by-pass line 73 is provided to by-pass part of the recycle gas around the drier in order to control the water content of the recycle gas stream to the pretreater. In the system as shown in Fig. 2, the water content may be around 0.3 to 1.0 mole percent whereas in the case of a pretreater as shown in Fig. 1, the minimum water content can be as low as 0.1 mol percent since the gas there first serves to strip water from the pretreated catalyst and therefore accumulates water before it reaches the area or zone where pretreatment or reduction of the regenerated catalyst takes place. It will be understood that suitable vent lines and other means for regeneration of the drier 53 are provided in the system of Fig. 2 similar to that shown in Fig. 1.

The feed or charging stock to the hydroforming reactor may be a virgin naphtha, a cracked naphtha, a Fischer-Tropsch naphtha, or the like, having a boiling range of from about 125 to 430° F., or it may be a narrow boiling cut from within this broad range. The feed stock is preheated alone or in admixture with recycle gas to reaction temperature or to the maximum temperature possible while avoiding thermal degradation of the feed stock. Ordinarily preheating of the feed stock is carried out to temperatures of about 800–1050° F., preferably about 1000° F. Thermal degradation at preheat temperatures can be minimized by limiting the time of residence in the transfer and feed inlet lines.

The recycle gas which contains from about 40 to 80 volume percent hydrogen is preheated to temepratures of about 1100–1200° F., preferably about 1150° F. prior to the introduction thereof into inlet line 11. The recycle gas should be circulated through the reactor at a rate of from about 1000 to 8000 cu. ft. per bbl. of naphtha feed. The amount of recycle gas added is preferably the minimum amount that will suffice to carry the necessary heat of reaction into the reaction zone and keep carbon formation at a satisfactory low level.

The reactor system is charged with a mass of finely divided hydroforming catalyst particles. Suitable catalysts include group VI metal oxides such as molybdenum oxide, chromium oxide, or tungsten oxide or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, magnesia, ceria or potassia can be included in the catalyst. The catalyst particles are, for the most part, between 200 and 400 mesh in size or about 0–200 microns in diameter with a major proportion between 20 and 100 microns.

The hydroforming reactor vessel is operated at temperatures between 850 and 950° F., preferably about 900° F. and at pressures between about 50 and 500 lbs. per sq. inch. Temperatures appreciably above 900° F. result in increased carbon formation and lower selectivity to gasoline fractions. At temperatures below 900° F. operating severity is low and would therefore require an excessively large reaction vessel. Lowering reactor pressure below 200 lbs. per sq. inch results in increased carbon formation which becomes excessive below about 25 lbs. per sq. inch. Above 200 lbs., catalyst selectivity to light products ($C_4$'s and lighter) increases rapidly. The regenerator vessel is operated at essentially the same pressure as the hydroforming reactor vessel 10 and at temperatures of about 1100–1200° F. The average residence time of the catalyst in the reactor is of the order of from about 2 to 4 hours while the average residence time of the catalyst in the regenerator is of the order of from about 3 to 15 minutes. In some cases, particularly when running high sulfur content feeds, it may be desirable to increase the holding time of the catalyst in the regenerator to a minimum of about ½ hour and up to as long as about 4 hours.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt/hr./wt. to about 0.15 wt./hr./wt.

The foregoing description contains a limited number of embodiments of the present invention. It will be understood that this invention is not to be limited thereto since numerous variations are possible without departing from the scope or spirit of this invention.

What is claimed is:

1. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, mixing reactor catalyst particles with the withdrawn regenerated catalyst in sufficient amount to form a mixture having a temperature below about 1050° F., contacting the mixture of catalyst particles in a pretreatment zone with a hydrogen-containing gas having an inlet water content of about 0.1 to 1.0 mole percent in sufficient quantity to maintain the outlet water content below about 5% maintaining the regenerated catalyst particles in contact with said hydrogen containing gas until they have been substantially freed of water formed by reaction of the regenerated catalyst with hydrogen and recycling the regenerated catalyst particles to the reaction zone.

2. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonacious deposits therefrom at elevated temperatures in a separate regeneration zone, withdrawing regenerated catalyst particles from the regeneration zone, contacting the withdrawn regenerated catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, drying the recycle gas to a water content of about 0.1 to 1.0 mole percent and recycling the dried recycle gas to the pretreatment zone.

3. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, mixing reactor catalyst particles with the withdrawn regenerated catalyst in sufficient amount to form a mixture having a temperature below about 1050° F., contacting the mixture of catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, drying the recycle gas to a water content of about 0.1 to 1.0 mole percent and recycling the dried recycle gas to the pretreatment zone.

4. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, contacting the withdrawn regenerated catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, cooling the recycle gas to about 100–500° F., drying the cooled recycle gas to a water content of about 0.1 to 1.0 mole percent by contacting the same with a solid dehydrating agent and recycling the dried recycle gas to the pretreatment zone.

5. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, mixing reactor catalyst particles with the withdrawn regenerated catalyst in sufficient amount to form a mixture having a temperature below about 1050° F., contacting the mixture of catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, cooling the recycle gas to about 100–500° F., drying the cooled recycle gas to a water content of about 0.1 to 1.0 mole percent by contacting the same with a solid dehydrating agent and recycling the dried recycle gas to the pretreatment zone.

6. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, countercurrently contacting the withdrawn regenerated catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, drying the recycle gas to a water content of about 0.1 to 1.0 mole percent and recycling the dried recycle gas to the pretreatment zone.

7. In a process for reforming hydrocarbon fractions boiling within the motor fuel range in contact with finely divided hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, mixing reactor catalyst particles with the withdrawn regenerated catalyst in sufficient amount to form a mixture having a temperature below about 1050° F., countercurrently contacting the mixture of catalyst particles in a pretreatment zone with a hydrogen-containing gas having an inlet water content of about 0.1 to 1.0 mole percent in sufficient quantity to maintain the outlet water content below about 5%, maintaining the regenerated catalyst particles in contact with said hydrogen-containing gas until they have been substantially freed of water formed by reaction of the regenerated catalyst with hydrogen, recycling the regenerated catalyst particles to the reaction zone, withdrawing recycle gas containing substantial amounts of water vapor from the pretreatment zone, drying the recycle gas to a water content of about 0.1 to 1.0 mole percent and recycling the dried recycle gas to the pretreatment zone.

8. In a process for reforming hydrocarbon fractions boiling within the motor fuel range in contact with hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, suspending the regenerated catalyst particles in a stream of hydrogen-containing gas having an inlet water content of about 0.1 to 1.0 mole percent, passing the suspension of regenerated catalyst and gas upwardly through a plurality of pretreating zones in series, separating the regenerated catalyst particles from the gas, passing said separated regenerated catalyst particles downwardly through a stripping zone, passing a stream of hydrogen-containing gas having an inlet water content of about 0.1 to 1.0 mole percent upwardly countercurrent to the descending regenerated catalyst particles in the stripping zone in order to substantially free the regenerated catalyst of water formed by the reaction of the regenerated catalyst with hydrogen, withdrawing stripped regenerated catalyst particles from the bottom of the stripping zone and recycling the regenerated catalyst particles to the reforming reaction zone.

9. In a process for reforming hydrocarbon fractions boiling within the motor fuel range in contact with hydroforming catalyst particles comprising a group VI metal oxide upon a support in accordance with the fluidized solids technique, the improvement which comprises continuously withdrawing a stream of spent catalyst particles from a reforming reaction zone, regenerating the withdrawn catalyst particles by burning carbonaceous deposits therefrom at elevated temperatures in a separate regeneration zone, withdrawing regenerated catalyst particles from the regeneration zone, mixing reactor catalyst particles with the hot regenerated catalyst particles to cool the latter, suspending the mixture of reactor and regenerated catalyst particles in a stream of hydrogen-containing gas having an inlet water content of about 0.1 to 1.0 mole percent, passing the suspension of reactor and regenerated catalyst and gas upwardly through a plurality of pretreating zones in series, separating the catalyst particles from the gas, passing said separated catalyst particles downwardly through a stripping zone, passing a stream of hydrogen-containing gas having an inlet water content of about 0.1 to 1.0 mole percent upwardly countercurrent to the descending catalyst particles in the stripping zone in order to substantially free the catalyst of water formed by the reaction of the regenerated catalyst with hydrogen, withdrawing stripped catalyst particles from the bottom of the stripping zone and recycling the catalyst particles to the forming reaction zone.

10. The process as defined in claim 1 in which the hydrogen-containing gas in the active pretreating zone contains 0.5 to 5.0 mole percent water.

11. The process as defined in claim 2 in which the hydrogen-containing gas in the active pretreating zone contains 0.5 to 5.0 mole percent water.

12. The process as defined in claim 3 in which the hydrogen-containing gas in the active pretreating zone contains 0.5 to 5.0 mole percent water.

13. The process as defined in claim 1 in which the hydrogen-containing gas in the active pretreating zone contains 0.5 to 5.0 mole percent water and the catalyst recycled to the reactor zone contains 0.1 to 0.8 wt. percent water.

14. The process as defined in claim 2 in which the hydrogen-containing gas in the active pretreating zone contains 0.5 to 5.0 mole percent water and the catalyst recycled to the reactor zone contains 0.1 to 0.8 wt. percent water.

15. The process as defined in claim 3 in which the hydrogen-containing gas in the active pretreating zone contains 0.5 to 5.0 mole percent water and the catalyst recycled to the reactor zone contains 0.1 to 0.8 wt. percent water.

References Cited in the file of this patent
UNITED STATES PATENTS

| | | |
|---|---|---|
| 2,131,089 | Beeck | Sept. 27, 1938 |
| 2,406,112 | Schulze | Aug. 20, 1946 |
| 2,433,603 | Danner | Dec. 30, 1947 |
| 2,472,844 | Munday | June 14, 1949 |
| 2,530,977 | Martin | Nov. 21, 1950 |
| 2,642,385 | Berger | June 16, 1953 |
| 2,663,676 | Cardwell | Dec. 22, 1953 |